H. P. EWELL.
SEPARATOR.
APPLICATION FILED NOV. 29, 1909.

1,091,917.

Patented Mar. 31, 1914.
8 SHEETS—SHEET 1.

Fig. 1.

Witnesses
O. B. Baenziger.
J. G. Howlett.

Inventor
Herbert P. Ewell.
By
F. W. Wheeler.
Attorney.

H. P. EWELL.
SEPARATOR.
APPLICATION FILED NOV. 29, 1909.

1,091,917.

Patented Mar. 31, 1914.
8 SHEETS—SHEET 2.

Fig. 2.

H. P. EWELL.
SEPARATOR.
APPLICATION FILED NOV. 29, 1909.

1,091,917.

Patented Mar. 31, 1914.
8 SHEETS—SHEET 4.

H. P. EWELL.
SEPARATOR.
APPLICATION FILED NOV. 29, 1909.

1,091,917.

Patented Mar. 31, 1914.
8 SHEETS—SHEET 5.

H. P. EWELL.
SEPARATOR.
APPLICATION FILED NOV. 29, 1909.

1,091,917.

Patented Mar. 31, 1914.
8 SHEETS—SHEET 7.

H. P. EWELL.
SEPARATOR.
APPLICATION FILED NOV. 29, 1909.

1,091,917.

Patented Mar. 31, 1914.
8 SHEETS—SHEET 8.

Witnesses
O. B. Baenziger.
J. G. Howlett.

Inventor
Hubert P. Ewell.
By
E. S. Wheeler.
Attorney.

UNITED STATES PATENT OFFICE.

HERBERT P. EWELL, OF DETROIT, MICHIGAN.

SEPARATOR.

1,091,917.  Specification of Letters Patent.  Patented Mar. 31, 1914.

Application filed November 29, 1909.  Serial No. 530,316.

*To all whom it may concern:*

Be it known that I, HERBERT P. EWELL, a citizen of the United States, residing at Detroit, in the county of Wayne, State of Michigan, have invented certain new and useful Improvements in Separators; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a separator, especially designed for separating gold and other precious metals from their ores, and consists in the construction and arrangement of parts hereinafter more fully set forth and pointed out particularly in the claims.

The primary object of the invention is to provide simple and efficient means for separating precious metals from their ores by the process of amalgamation, provision being made for preventing the oxidization of the mercury and for removing the base metal amalgam therefrom from time to time, as may be necessary to maintain the mercury in a fluid state, and prevent the clogging of the machine by the accumulation of base metal amalgam; the arrangement being such that the removal of the base metal amalgam is accomplished without stopping the operation of the machine.

A further object is to provide for effecting a metallic contact between the amalgamating material and the metal to be amalgamated, thereby inducing rapid amalgamation and a complete separation of the metal from the ore.

A further object is to provide means for passing the ore over a body of active mercury and for so moving the ore during such passage as to insure contact between the metal therein and the amalgamating material.

A further object is to provide means for supplying metallic sodium, or other reducing agent, to the amalgamating material in such quantity as may be required, according to the character of the ore being handled, to form a liquid reducing amalgam and to provide for maintaining a constant circulation of liquid reducing amalgam through the machine in contact with the ore pulp passing therethrough.

A further object is to provide means for drawing off the precious metal amalgam from time to time during the operation of the machine and for preventing access to said amalgam in the machine except by one having proper authority.

The above objects are attained by the mechanism illustrated in the accompanying drawings, in which:—

Fig. 15 is a fragmentary view partly in vertical section through the chamber in which the reducing amalgam is formed and through the receptacle in which the base metal amalgam is removed from the mercury or amalgamating material. Fig. 16 is a horizontal section as on line 16—16 of Fig. 15. Fig. 17 is a horizontal section through the receptacle for the precious metal amalgam, as on line 17—17 of Fig. 15. Fig. 17$^A$ is a perspective view of the key employed for locking the receptacle for the precious metal amalgam.

Figures 11, 12, 13, 14:
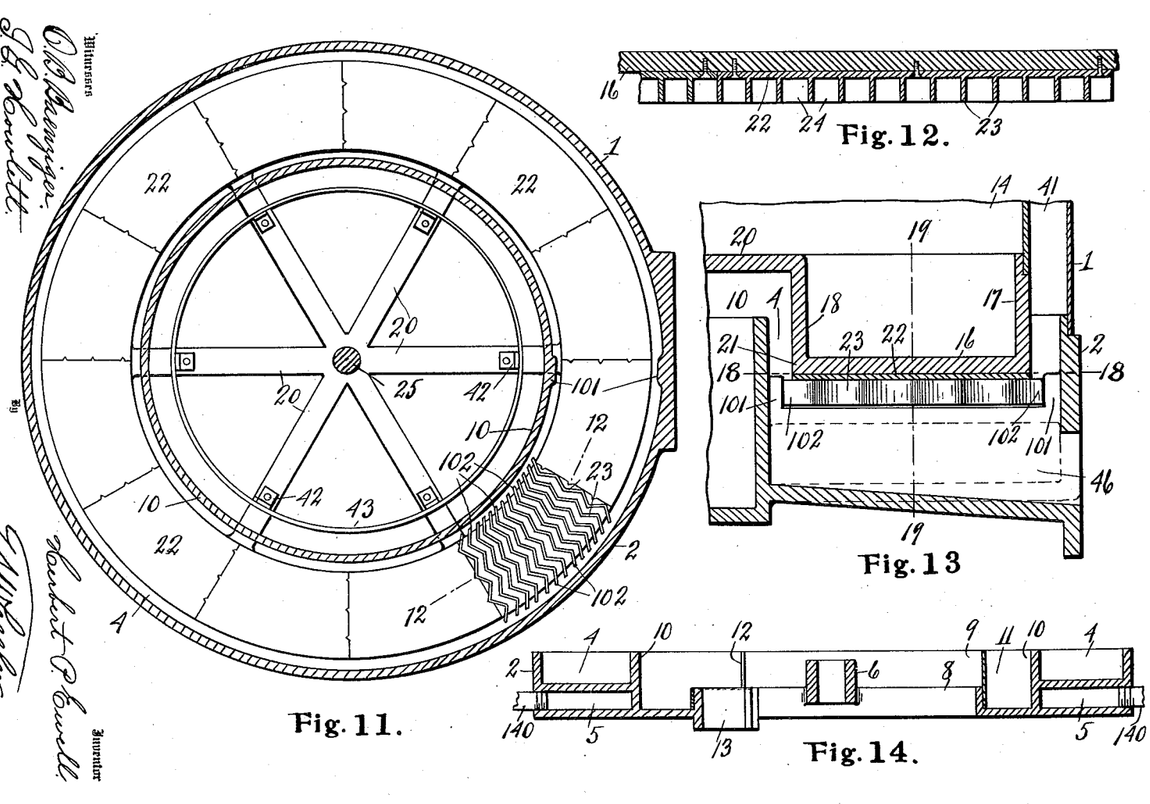
Fig. 11 is an inverted fragmentary view in horizontal section through the lower portion of the case below the drum, showing in plan the zigzag copper ribs arranged on the under face of the drum, the line of the section being indicated by dotted line 11—11 of Fig. 3.
Fig. 12 is an enlarged sectional view through the zigzag copper ribs attached to the bottom or under face of the drum; the line of said section being indicated by dotted line 12—12 on Fig. 11.
Fig. 13 is an enlarged cross section through the trough which conveys the ore pulp through the machine and through a portion of the depending part of the drum which carries the copper ribs and extends into said trough; the line of said section being through one of the depressions through which said trough is made to communicate with the chamber in which the reducing amalgam is formed.
Fig. 14 is a transverse section through the base of the machine; the line of said section being indicated by dotted line 14—14 on Fig. 2.

Referring to the characters of reference, 1 designates a cylindrical case, preferably formed of sheet metal, which is supported upon a cast circular base 2 mounted upon suitable legs or pedestals 3. The base 2 which serves as a bottom for the case is shown very clearly in cross section in Fig. 14, and comprises an annular trough 4 through which pass the mercury, or other amalgamating material, and the ore pulp. Below said trough is an annular heating chamber 5 for the reception of steam, or other heating medium. The hub 6 of the base is supported by the radial arms 7 extending inwardly from the annular flange 8. Embracing said flange and rising vertically therefrom is a sheet metal flange 9, which, together with the concentric flange 10 of the base, form the annular launder 11 into which the ore overflows from the trough 4. At a certain point the flange 9 forming the inner wall of the launder is cut away, as shown at 12, to the level of the top of the short flange 8 of the base, to allow the ore pulp to escape from the launder through a kind of discharge spout 13 shown in Figs. 2 and 14.

Rotatably mounted within the case is a drum 14 having a top 15 of circular form which inclines toward the perimeter of the drum, and provided with a circular bottom 16 having the concentric flanges 17 and 18. The outer flange 17 receives and supports the lower edge of said drum, while the inner flange 18 is connected to the bottom hub 19 of the drum by the spider arms 20. The lower edges of the flanges 17 and 18 are connected by the flat bottom portion 16, which bottom portion and the flanges 17 and 18 form a depending ring 21 which lies within the trough 4 and upon the under side of which is mounted the copper plates 22 which are of such shape as to describe a circle concentric with the drum, and which have cast upon the under face thereof the depending zigzag ribs 23 radially disposed in juxtaposition, forming therebetween tortuous channels for the passage of the ore pulp transversely of the trough 4. The body or bath of mercury which occupies said trough will be maintained at such a level as to submerge said ribs and lie in contact with the under faces of said plates 22, so that the ore pulp in passing through the channels between said ribs will move in contact on all sides with amalgamating surfaces; that is to say, above the ore will be the copper plates 22, and upon each side thereof the copper ribs 23, while the mercury, or other amalgamating material, will form the surface over which the ore must pass. By arranging the ribs in a zigzag manner, as shown, the ore in passing through the channels between said ribs, is caused by the bends therein to frequently change its course, insuring contact between the metals in the ore and one of the amalgamating walls surrounding said passages before the passage of the ore through said channels is completed, thereby insuring amalgamation and separation of the metal from the ore pulp.

The drum 14 is mounted upon a vertical shaft 25 which is stepped in a bearing 26 on the frame of the machine and passes through and revolves in the hub 6 of the base which becomes a journal bearing therefor, said shaft passing through and being fixed in the hub 19 of the bottom part of said drum, and in the hub 27 of the top part thereof. Upon the projecting upper end of the shaft 25 is supported a hopper 28 having perforations 29 in the bottom thereof, through which the ore pulp is discharged onto the inclined top of the drum. The hopper is supported upon a collar 30 which rests upon the upper end of the hub 27. The drum is rotated by means of a sprocket wheel 31 on the lower end of the shaft 25 driven by a sprocket chain 32 from a sprocket wheel 33 on the lower end of the vertical shaft 34 carrying at its upper end a beveled gear 35 which meshes with a beveled pinion 36 on the main shaft 37 carrying a belt pulley 38 adapted to be driven by a belt 39 from any suitable source of power. To provide for a vertical adjustment of the drum 14 to regulate the space between the depending copper ribs on the bottom thereof and the bottom of the trough 4, an adjusting screw 40 is employed which is threaded in the bearing 26 and engages the lower end of the shaft of said drum, whereby through the turning of said screw, the drum may be adjusted vertically, as may be required.

In practice, the drum is revolved slowly and the ore pulp which is fed onto the top thereof from the hopper, flows readily down the inclined top of the drum and is discharged from the rim of said top into the annular space 41 between the outer face of the drum and the inner face of the wall of the case. The bottom of the space 41 communicates with the outer margin of the trough 4 of the base and the ore pulp forms in a column at the bottom of the annular space 41 until it has attained sufficient head to displace the mercury and force a passage across the trough 4 through the channels 24 between the copper ribs 23 on the bottom of the drum, at the same time the ore is carried circumferentially through said trough by the rotation of the drum through the turning of the shaft 25. It will therefore be understood that the pulp not only crosses the trough transversely above the mercury and between the copper ribs and below the copper plates on the drum, but is also carried circumferentially around said trough as the drum revolves, said pulp overflowing from the trough 4 over the top of the flange 10 into the launder 11. From the launder, the ore is discharged through a spout opening 13 into any suitable receptacle, from which it is conveyed away in any desired manner.

To prevent the possibility of the escape of any of the mercury which may have passed with the ore pulp from the separating trough 4 into the launder, there is mounted upon the spider arms 20 of the bottom of the drum by means of suitable brackets 42, a depending annular flange 43 which dips into the launder to a point adjacent the bottom thereof, so that all of the ore pulp which passes into the launder from the separating trough must in turn pass under the lower edge of the flange 43, causing the mercury to settle to the bottom of the launder, whence it may be removed when desired.

Figure 18:
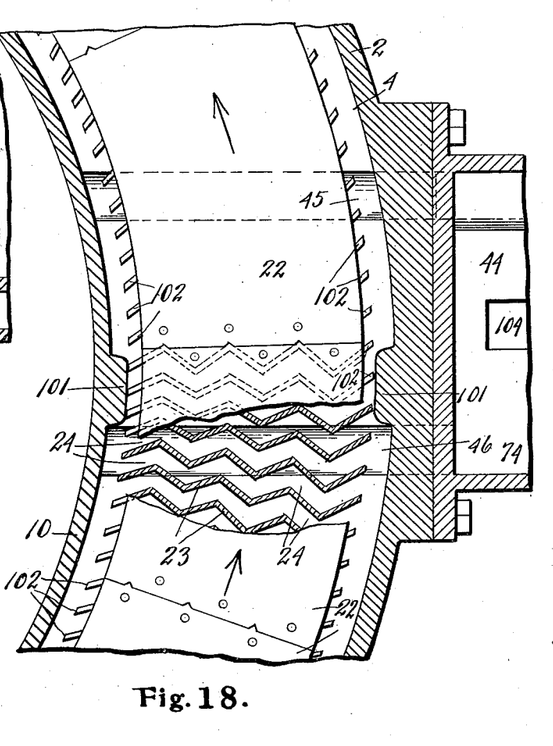
Fig. 18 is a fragmentary view in horizontal section as on line 18—18 of Fig. 13.
Figure 19:
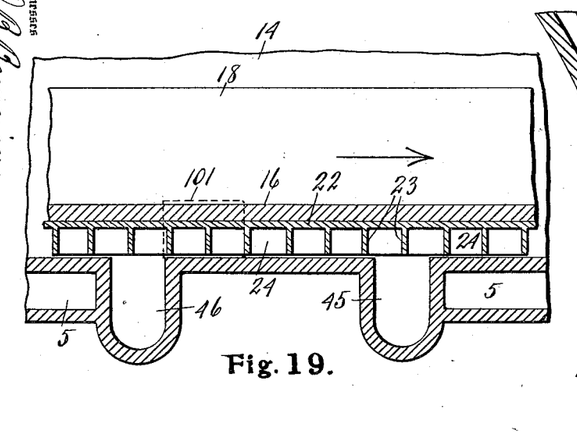
Fig. 19 is a vertical section as on line 19—19 of Fig. 13.

It will be noted on referring especially to Fig. 18 that the ends of the ribs 23 project beyond the sides of the depending annular portion of the bottom of the drum. Because of the shape of said ribs and the manner in which they are placed, the ends thereof upon the feed side of the separating trough project forwardly in the direction in which the drum rotates, while the ends of said ribs on the discharge side of said trough extend rearwardly with respect to the direction of rotation of said drum. This arrangement facilitates the feeding of the ore pulp through the channels between said ribs.

In order to facilitate the separation of precious metals from their ores by the process of amalgamation, it is necessary to reduce the oxidization which envelops said metals to a greater or lesser extent in order that a perfect metallic contact may be effected between said metals and the amalgamating material. It is well known that sodium has great affinity for oxygen and that the presence of sodium in the mercury in the form of sodium amalgam is effective in reducing the oxidization on gold and other precious metals, and facilitating amalgamation thereof with the mercury; for that reason sodium as a reducing agent is preferred. To make commercially practicable the use of sodium amalgam in the separation of precious metals from their ores, it is necessary to maintain a constant supply of the reducing agent and to bring the metals into contact with the reducing amalgam during the passage of the ore pulp through the separator. To enable the carrying out of this idea, I have provided a receptacle 74 in which is a closed chamber 44 adapted to contain a considerable body of mercury, and wherein the level of the mercury will be maintained on the plane or slightly below the plane of the mercury level in the separating trough. Said chamber 44 may be termed the "amalgam chamber," for it is in said chamber that the sodium, or other reducing agent, is commingled with the mercury in such quantity as to form a reducing amalgam and maintain said amalgam in such a state of fluidity as to insure the free flow thereof through the machine. The lower portion of said chamber is made to communicate with the separating trough through the transversely formed depressions 45 and 46, respectively, in the bottom thereof which lie in parallel relation and communicate at their outer ends with said chamber, the depression 45 serving as an educt passage through which mercury impregnated with sodium is fed from the amalgam chamber 44 upwardly into the separating trough against the plates 22 and the ribs 23 depending therefrom, and the depression 46 serving as an induct passage through which the mercury is returned from said trough into said chamber. The induct passage 46 communicates with the amalgam chamber 44 through the opening in the side of said chamber, and the educt passage 45 through a way 48 formed in the wall thereof in which is located a feed worm 49, entrance to said way from the chamber 44 being effected through the opening 50, in the chamber wall, said opening being diagonal across said chamber from the opening 47, as clearly shown in Fig. 10. By means of the worm 49, a forced feeding of the reducing amalgam from the chamber 44 is effected, thereby insuring a continuous and positive flow of said amalgam from said chamber into the separating trough around said trough and back to said chamber. The feed worm 49 is mounted on a shaft 51 carrying a sprocket wheel 52 which is driven by a chain 53 from a sprocket wheel 54 on the main shaft 37.

Figure 2:
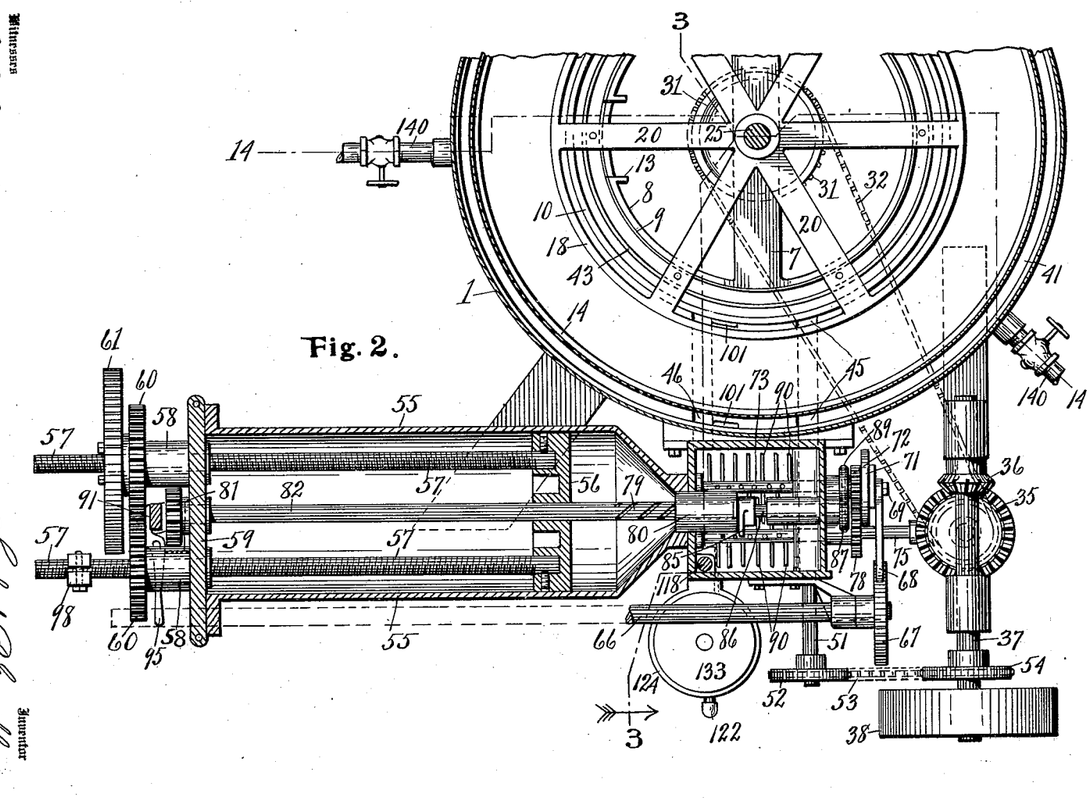
Fig. 2 is a horizontal section through the machine on an indefinite plane to more clearly show the relative association and arrangement of the operative parts; some of said parts appearing in elevation.
Figure 3:
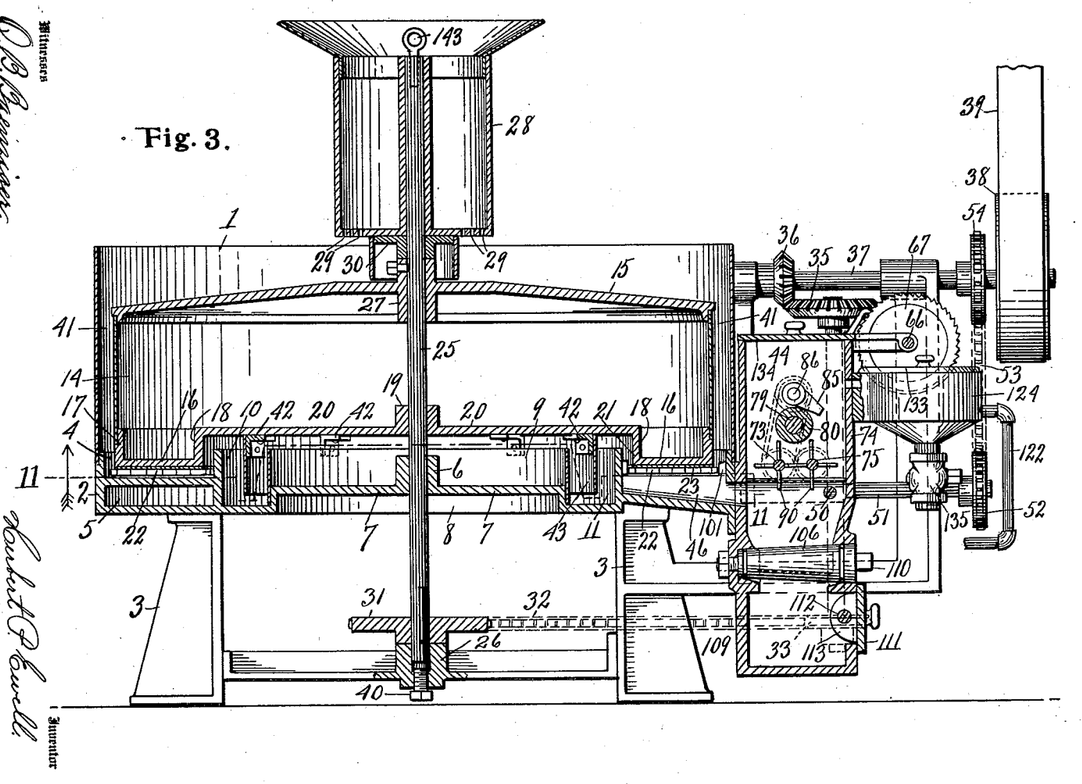
Fig. 3 is a vertical section, as on line 3—3 of Fig. 2.
Figures 4, 7:
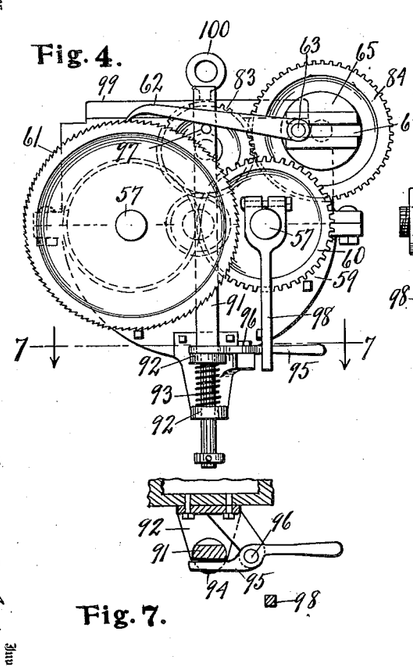
Fig. 4 is an end elevation of the gearing employed to drive the sodium-feeding mechanism.
Fig. 7 is a fragmentary view in section as on line 7—7 of Fig. 4.
Figures 8, 9, 10:
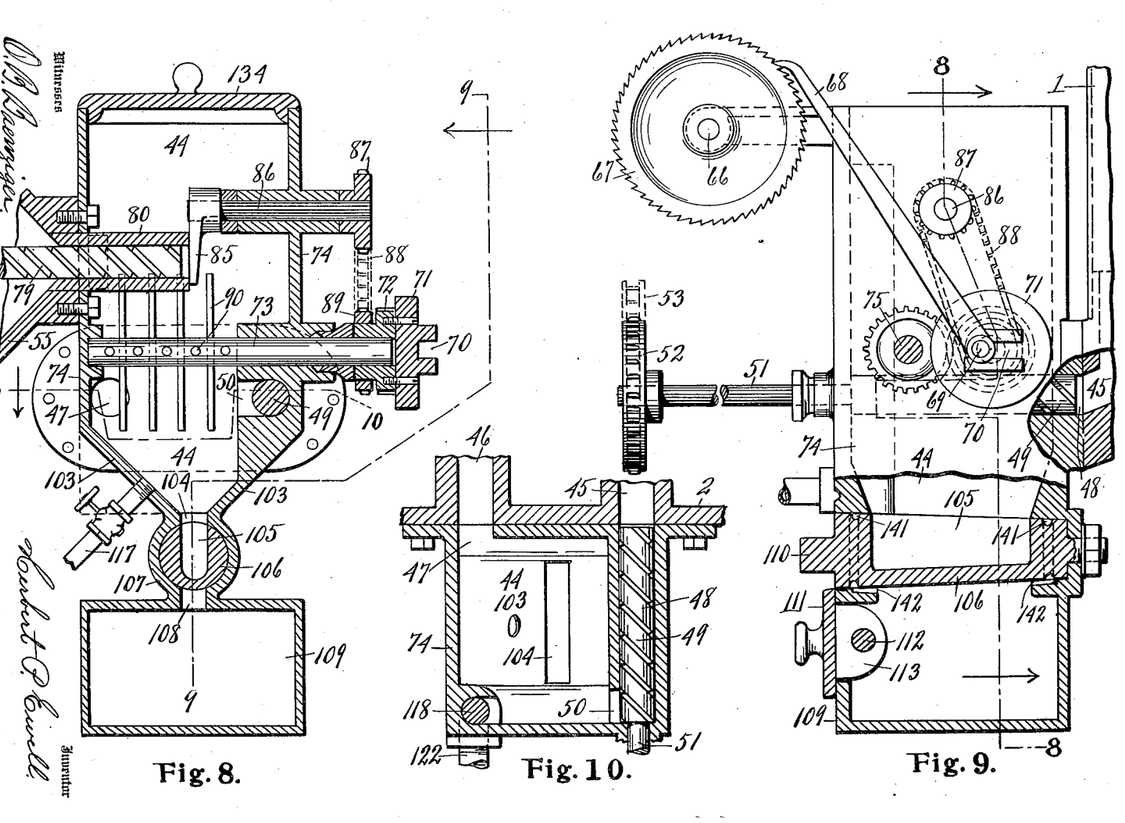
Fig. 8 is a vertical section of that portion of the machine in which the reducing amalgam is formed; the line of said section being indicated by dotted line 8—8 on Fig. 9.
Fig. 9 is a fragmentary view of the same parts partly in section, as on line 9—9 of Fig. 8.
Fig. 10 is a fragmentary view in horizontal section through the chamber in which the reducing amalgam is formed; the line of said section being indicated by dotted line 10—10 of Fig. 8.

To provide for feeding the sodium in a given quantity into the mercury in the chamber 44, and for varying the quantity of sodium which is fed into said chamber, as conditions may require, there is employed a sodium-containing cylinder 55, in which is fitted a movable piston 56, as clearly shown in Fig. 2. Fixed in said piston and extending longitudinally of said cylinder are the feed screws 57 which pass through and are threaded in the nuts 58 journaled in the end 59 of the cylinder 55 and carrying the meshing gear wheels 60. Secured to the outer face of one of the gear wheels 60 is a ratchet wheel 61 which is driven through the medium of a pawl 62 pivoted to a sliding pin 63 mounted in a channel 64 (see Fig. 4) in the face of a disk 65 on the outer end of shaft 66. The pin 63 being eccentric to the axis of shaft 66, the rotation of said shaft will cause the pawl to reciprocate and impart an intermittent rotation to the ratchet wheel 61; the distance which said ratchet wheel is turned for each movement of the pawl being controlled by the distance which the pin 63 is set off center with respect to the axis of the shaft 66. Movement is imparted to shaft 66 through the medium of a ratchet wheel 67 on the opposite end thereof which is engaged by a pawl 68 pivoted on a pin 69 slidable in a way 70 on the face of the disk 71, as shown in Figs. 8 and 9. Said disk 71 is fixed to the face of a gear wheel 72 mounted on the projecting end of a shaft 73 which crosses the receptacle 74 transversely and is journaled in the walls thereof. Parallel with the shaft 73 and journaled in like manner in the case 74 is a shaft 75. Shaft 75 is longer than its companion shaft 73 and carries at its end a beveled gear 76 which meshes with a like gear 77 on the vertical shaft 34, whereby shaft 75 is rotated and in turn imparts a rotary movement to its companion shaft 73 by means of the pinion 78 thereon which meshes with the gear wheel 72 on said shaft 73. By this means a reciprocatory movement is imparted to the pawl 68 which drives the ratchet wheel 67 and turns intermittently the shaft 66. By adjusting the pin 69 in the slot 70 on the face of the disk 71, the throw of the pawl 68 may be regulated to vary the movement which is imparted to said ratchet wheel through each operation of said pawl.

Figures 5, 6:
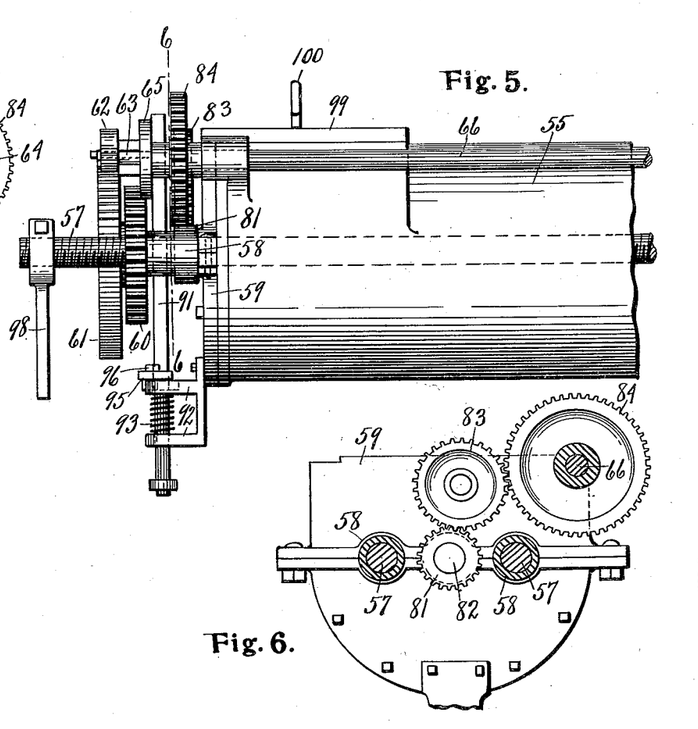
Fig. 5 is a side elevation of the mechanism shown in Fig. 4, the remainder of the machine being broken away.
Fig. 6 is a transverse section as on line 6—6 of Fig. 5.

It will now be apparent that through the turning of the shaft 66, the gear wheels 60 will be turned through the operation of the pawl 62 and ratchet 61, thereby turning the shafts 57 within the nuts 58 and screwing said shafts through said nuts to drive forward the plunger 56. In charging the machine the piston is retracted and the cylinder 55 in advance of the piston is filled with sodium to such an extent as may be desired. As the gear wheels 60 slowly and intermittently turn through the driving mechanism previously described, the piston 56 will be caused to advance slowly in the cylinder and force the plastic sodium into the tapered end of the cylinder around the feed worm 79 which lies in a horizontal tube 80 extending from the tapered end of the cylinder 55 into the receptacle 74, as clearly shown in Fig. 8. The feed worm 79 is rotated to feed the sodium through the tubular projection 80 by means of a pinion 81 on the end of the shaft 82 of said worm, said pinion meshing with an idle gear wheel 83 (see Figs. 6 and 7) which meshes with a gear wheel 84 on the end of shaft 66. As the sodium is forced through the tubular projection 80 into the chamber 44 of the case 74, a very thin slice is cut therefrom by the rotary knife 85 which is mounted on the inner end of a shaft 86 extending into said chamber and carrying upon its outer end a sprocket wheel 87 driven by a chain 88 from a sprocket wheel 89 on the hub of the gear wheel 72. The thin shavings of sodium which are shaved off by the knife 85 from the end of the core forced through the tubular projection 80 by the feed worm 79, fall into the mercury in the lower portion of the chamber 44 through a stratum of oil which covers the top of said mercury and which is employed to exclude the air from the mercury at the point of introduction of the sodium thereinto to avoid the chemical reaction which follows upon mixing sodium with mercury in the presence of atmospheric air. The particles of sodium which fall into the mercury from the knife are mixed therewith by the operation of the radial mixing arms 90 which are mounted upon the parallel shafts 73 and 75, thereby thoroughly commingling the sodium and mercury and producing fluid sodium amalgam because of the excess of mercury in volume over the sodium.

It will be noted that the cylinder 55 is of considerable capacity, the amount of sodium which it will contain being sufficient to last for a long period of time. The travel of the piston 56 forward to crowd the sodium against the feed worm 79 is very gradual. To obviate the necessity on the part of the operator of watching the movement of said piston so as to arrest it at the limit of its inward travel, an automatic tripping device is arranged which will stop the operation of the piston feeding mechanism before said piston shall have reached the limit of its inward travel. Said tripping mechanism comprises a vertical plunger bolt 91 supported to slide through the bracket arms 92 mounted on the end of the cylinder and constantly urged upwardly by a coiled spring 93 which embraces said plunger between the brackets 92, being attached at its upper end to said plunger and resting at its lower end upon the lower arm. Formed on said plunger above the upper bracket arm is a shoulder 94 adapted to be engaged by the inner end of a trip 95 pivotally mounted at 96. When the plunger 91 is forced downwardly to compress said spring, the trip 95 is moved so as to engage said shoulder and hold the plunger in said position. Projecting from the upper end of the plunger is a pin 97, which, when the plunger is depressed, lies under the pawl 62 which imparts movement to the ratchet wheel 61. Mounted on one of the longitudinally traveling screws 57 is a depending arm 98 whose lower end is adapted to encounter the trip 95 at a time when the piston 56 shall have nearly reached the limit of its inward travel and actuate said trip to disengage it from the shoulder of the plunger 91, thereby permitting the spring to lift said plunger and raise the pawl 62 from engagement with the ratchet wheel 61 by contact of the pin 97 with said pawl. Upon the lifting of the pawl 62 from the ratchet 61, the feed of the plunger 56 will cease until said parts shall have been restored to their normal position. The plunger 56 may be retracted in the cylinder 55 by raising the pawl 62 from engagement with the ratchet wheel and rotating the gears 60 in a direction to cause the screws to run outwardly through the nuts 58. There is an opening through the top of the cylinder near its rear end to afford access thereto for charging the cylinder with sodium, and other purposes, which is closed by a heavy top 99 provided with a dead eye 100 for the purpose of lifting said top.

The operation of the feed worm 49 which forces the mercury from the receptacle 74 outwardly through the educt passage 48 into the separating trough, reduces somewhat the level of the mercury in said receptacle, which, together with the rotary movement of the drum, maintains a constant circulation of mercury and sodium in the form of sodium amalgam, around said trough and back into said receptacle, as before described. While the flow or circulation of the mercury and sodium or sodium amalgam just described is constant, it is gradual, there being no friction to cause a flouring of the mercury, and there being always an excess of mercury in a high state of activity, owing to the presence of the sodium, the gold amalgam formed is prevented from sticking to the copper plates and ribs of the drum and settles to the bottom of the separating trough, around which it is conveyed by depending ribs on the bottom of said drum and is caused to flow with the circulating mercury into the receptacle 74 through the opening 47 at a point below the operation of the mixing arms 90. The inflowing mercury therefore remains comparatively quiet in the lower portion of said receptacle, allowing the gold amalgam to settle.

As before stated, the ore pulp flows from the inclined top of the drum into the space 41 between the circular wall of the drum and the inner wall of the case forming in a sufficient head therein to force a passage above the mercury through the zigzag passages 24 between the ribs 23 and below the plates 22 transversely of or across the separating trough 4, at the same time said pulp is carried around said trough by the rotary action of the drum with the circulating mercury. In order that the circulation of the mercury may be circumferentially of the trough 4 in the direction of rotation of said drum, there are provided between the transversely extending passages 45 and 46 which lead from the receptacle 74 and return thereto, the inwardly projecting abutments 101, shown more clearly in Fig. 18, which extend from the opposite vertical walls of said trough into terminal contact with the projecting ends 102 of the ribs 23, whereby a short circuiting of the mercury from the educt depression 45 and directly back through the induct depression 46 into the receptacle 74, instead of being compelled to pass entirely around the trough 4 before entering said induct depression is obviated. It will be noted on referring to Fig. 18 that the ends 102 of the ribs 23 are at all times in engagement with the faces of the abutments 101, thereby preventing the possibility of a short return of the mercury backwardly along the trough 4 from the educt depression 45 directly into the induct depression 46. It will also be noted on referring to Fig. 18 that the projecting ends 102 of the ribs 23 extending as they do beyond the margins of the depressed bottom portion of the drum, form openings between the margins of the drum and the abutments 101 through which the ore pulp may pass into the channels 24 between said ribs, thereby obviating the possibility of the machine clogging with ore pulp at that point. By permitting the ends 102 only of the ribs 23 to extend into terminal contact with the abutments 101, instead of allowing the vertical sides of the depressed bottom portion of the drum to have contact with said abutments, a grinding of the ore between said parts is obviated, and wear at that point is materially reduced.

Figure 1:
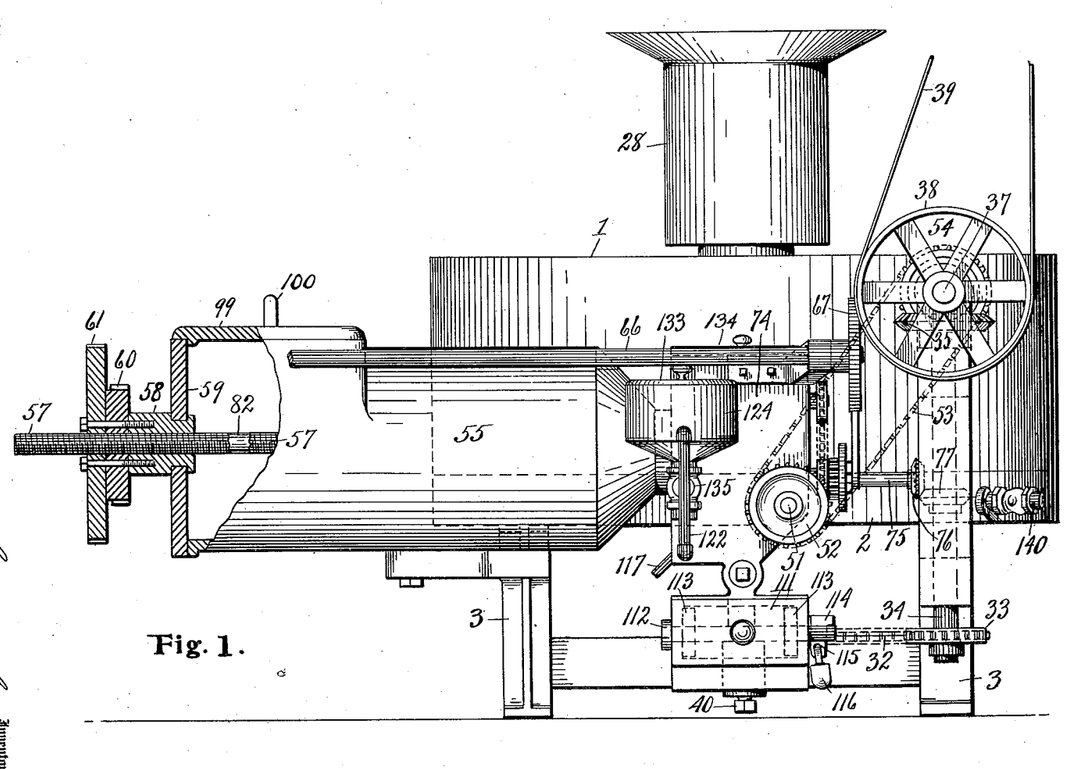
Figure 1 is a side elevation of a separator embodying my invention, a portion being in section to show construction of parts.
Figures 15, 16, 17, 17A:
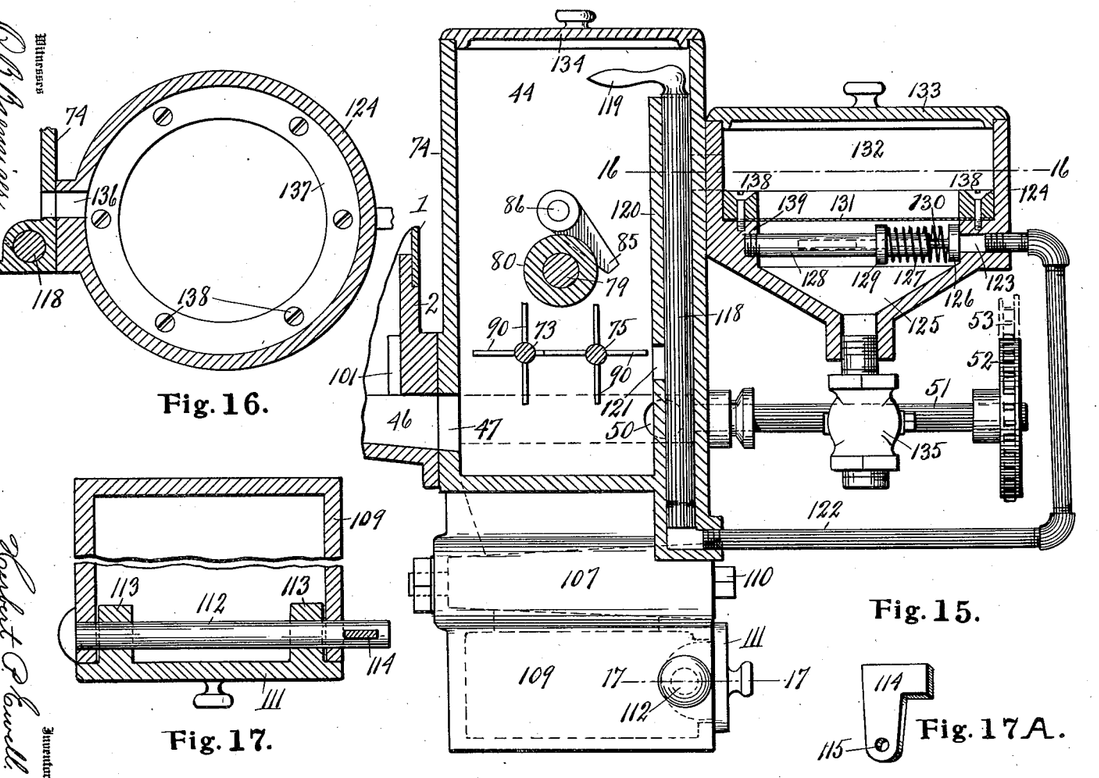

The circulation of mercury through the chamber 44 in the receptacle 74 being diagonally across said chamber from the opening 47 to the opening 50, as clearly shown in Figs. 8 and 10, the gold amalgam which flows into said chamber with the circulating mercury, is given ample opportunity to settle to the bottom thereof, the tapering walls of which, as shown at 103, direct the gold amalgam through the central opening 104, into the pocket 105 in the plug cock valve 106 confined in a suitable case 107 below the bottom of the receptacle 74. Said valve communicates through a passage 108 with a receiving box 109 adapted to contain gold amalgam, or other precious metal amalgam, as the case may be, said box being formed integral with the case 107 embracing the valve 106. Whenever the pocket 105 in said valve shall have become filled with gold amalgam, said amalgam may be discharged into the box 109 by applying a wrench to the square end 110 of said valve and rotating it one-half turn to permit the amalgam in said pocket to flow therefrom into said box. As the valve is rotated in discharging the gold amalgam from the pocket therein, the opening 104 in the bottom of the receptacle 74 becomes closed to prevent the discharge of mercury therethrough. This operation of removing the gold amalgam may be accomplished, as will be noted, while the machine continues its operation. Access to the gold amalgam box 109 is had through a door 111 which is held closed by a retractable bolt 112, shown more clearly in Fig. 17, which passes through the ends of said box and through the projecting ears 113 on said door, the projecting end of said bolt being slotted to receive a locking key 114 having an eye 115 therein for the passage of the bow of a pad lock 116 therethrough, as shown in Fig. 1. Leading from the bottom portion of the chamber 44 in the receptacle 74 is a valve controlled pipe 117, shown in Fig. 8, for the purpose of drawing the mercury from said chamber, when desired.

In working gold ores and other ores containing precious metals, base metals are encountered in varying quantities according to the character of the ore being treated. The presence of the sodium in the mercury maintains these base metals in a metallic state and insures their ready amalgamation with the mercury; the excess of mercury always present keeping the base metal amalgams in such a state of fluidity as to obviate the clogging of the machine by the accumulation of base metal amalgams in a plastic state. Where the base metals are present in a considerable quantity, it is necessary to remove the base metal amalgams from time to time to prevent the mercury becoming thickened and rendered sluggish by the presence thereof. The base metal amalgams being lighter than the mercury, will remain on the surface thereof, the level of which in the receptacle 74 will be about on a line with the axis of the shafts 73 and 75. To provide for removing the base metal amalgam from time to time, I employ a plunger pump 118, shown more clearly in Fig. 15, which may be operated by hand through the medium of the handle 119. Said plunger is adapted to reciprocate in a pump cylinder 120 formed in the inner wall of the receptacle 74. The bore of the pump cylinder is made to communicate with the chamber 44 by means of an opening 121 in the wall thereof located at about the level of the mercury in said chamber. Leading from the lower end of the pump cylinder is a pipe 122. The upper end of the pipe 122 communicates with a port 123 passing through the wall of a receptacle 124 in the bottom of which is formed a chamber 125 for base metal amalgam. Seated over the inner end of the port 123 is a valve 126 which is normally held on its seat by the coiled spring 127. This spring is mounted on a horizontally extending tubular projection 128 carrying a collar 129 against which one end of said spring bears. The valve 126 is provided with a stem 130 which extends into and is guided in said tubular projection. Crossing the receptacle 124 horizontally is a partition 131 of straining material, such as chamois, which divides said receptacle into an upper and a lower chamber; the lower chamber 125 being for the reception of base metal amalgam, and the upper chamber 132 being for the reception of the mercury which is separated from the base metal amalgam by passing through said partition. The receptacle 124 is closed by a removable top 133. To remove the base metal amalgam from the top of the mercury in the receptacle 74, the cover 134 of said receptacle is raised to afford access to the handle 119 of the pump plunger 118. By raising the pump plunger until the lower end thereof is above the level of the opening 121 in the wall of the pump cylinder, the base metal amalgam on the top of the mercury in the chamber 44 will flow into the pump cylinder, when by forcing the piston downwardly, said amalgam will be ejected from the pump cylinder through the pipe 122 and into the chamber 125 in the receptacle 124, the valve 126 unseating to permit the base metal amalgam to flow into said chamber, and again seating through the operation of the spring 127 at the terminal of each stroke of the pump plunger to prevent a backward flow of said amalgam. Communicating with the bottom of the chamber 125 is a valve 135 through which the base metal amalgam may be removed from said chamber from time to time, as desired. The mercury which is strained from the base metal amalgam by passing through the chamois 131 finds its way back to the chamber 44 by means of the passage 136 (see Fig. 16) formed through the walls of said chambers. To enable the chamois 131 to be replenished from time to time, a removable ring 137 is employed through which pass screws 138 that confine said ring upon an annular shoulder 139 in the receptacle 124 upon which the margin of the chamois 131 rests.

Communicating with the steam chamber 5 in the base 2 below the separating trough are the steam pipes 140 by means of which a circulation of steam may be maintained through said chamber for the purpose of heating the mercury in the separating trough to facilitate amalgamation.

It will be noted on referring to Fig. 9 that at each end of the plug cock valve 106 there is formed therein a circumferential channel 141, said channels communicating with the inclined channels 142 in the lower wall of the valve case. By this arrangement any gold amalgam which might work along said valve will enter the circumferential channels and from said channels will be directed into the channels 142 which discharge into the gold amalgam box 109, thereby obviating the loss of any gold amalgam by said amalgam working out at the ends of the valve 106.

In the upper end of the shaft 25 is a dead eye 143 to enable a block and tackle to be attached thereto, or other hoisting means, for the purpose of lifting the drum out of the circular case 1, when it is desired to clean up the machine or for the purpose of affording access to the interior of the case.

The ore pulp which is fed into the annular space 41 between the wall of the case and the outer face of the drum is prevented from clogging therein because of the rotary movement of the drum within the case, which movement keeps the ore pulp under continual agitation and obviates the possibility of the ore lodging in said space to such an extent as to hinder its free passage downwardly therethrough.

Having thus fully set forth my invention, what I claim as new and desire to secure by Letters Patent, is:—

1. A gold separator, comprising a trough adapted to contain amalgamating material, a flat plate crossing said trough, a plurality of zigzag ribs on the bottom of said plate spaced from one another, said ribs depending into the amalgamating material in the trough and affording amalgamating surfaces, the arrangement of said ribs forming tortuous passages for the ore pulp across the trough between their opposed faces and below said plate, and means for feeding ore pulp horizontally through said passages between said ribs in contact with the under face of said plate and with the surface of the amalgamating material in said trough.

2. A gold separator comprising a continuous trough adapted to contain amalgamating material, a series of spaced vertically disposed ribs extending into the amalgamating material in said trough and crossing the trough transversely, the bottom of said trough having ingress and egress openings for amalgamating material, means for feeding amalgamating material into said trough through said ingress opening, means for moving said ribs through the trough, means for feeding ore pulp across said trough between said ribs during the movement thereof, and means between said openings in the bottom of the trough to prevent the amalgamating material taking a short circuit between said openings and compelling the circulation thereof around the trough.

3. A gold separator, comprising a circular case having an annular trough in the bottom thereof to receive amalgamating material, a rotary drum within said case having a depending annular portion suspended within said trough, a series of flanges on the bottom of the suspended annular portion of said drum adapted to extend into the amalgamating material in said trough and spaced to form transverse passages across the trough therebetween, the bottom of said trough having openings for the circulation of amalgamating material, means for rotating said drum, means for feeding ore pulp between the drum and case continuously in one direction to cause it to cross said trough in a continuous course from side to side thereof between said flanges, a launder to receive the ore pulp from said trough, and a discharge opening in the wall of the launder leading therefrom.

4. A gold separator, comprising a circular frame having an annular trough in the bottom thereof adapted to receive amalgamating material, a rotatable ring suspended in said trough having spaced radial flanges on the bottom thereof depending into the amalgamating material and crossing the trough transversely, means for rotating said ring, a launder within the frame below the plane of the trough, means for feeding ore pulp across said trough below the bottom of said ring and between said flanges in a manner to cause it to overflow into said launder, and means for supplying amalgamating material to said trough.

5. A gold separator, comprising a circular frame having an annular trough in the bottom thereof adapted to receive amalgamating material, a ring rotatable in the frame suspended over said trough and having spaced radial ribs on the bottom thereof depending into the amalgamating material and crossing the trough transversely, means for rotating said ring, a circular launder within the frame surrounded by said trough and below the plane thereof, means for feeding ore pulp across said trough between said ribs in a manner to cause it to overflow into said launder, and means for supplying amalgamating material to said trough.

6. A gold separator comprising a frame having an annular trough therein adapted to contain amalgamating material and an annular heating space below the bottom of said trough, a series of movable plates suspended in said trough and having spaced vertical ribs extending into said amalgamating material and crossing the trough transversely, means for moving said plates to carry said ribs through the trough, means for feeding ore across the trough below said plates and between said spaced ribs, and means for supplying amalgamating material to said trough.

7. A separator comprising a circular case having an annular trough at the bottom thereof for amalgamating material, a drum rotatable within the case and spaced therefrom, said drum having an inclined top and a vertical side parallel with the side of said case, a ring on the under side of said drum concentric with and suspended in said trough to dip into said amalgamating material, means for feeding ore pulp onto the top of said drum to flow into the space between the case and drum to form a column of pulp therein of sufficient gravity to displace the amalgamating material and cause the pulp at the bottom of the column to feed in a thin sheet transversely across the trough below and in contact with the bottom of said ring and over the surface of the amalgamating material.

In testimony whereof, I sign this specification in the presence of two witnesses.

HERBERT P. EWELL.

Witnesses:
I. G. HOWLETT,
O. B. BAENZIGER.